(12) United States Patent
Rupieper et al.

(10) Patent No.: US 6,618,050 B1
(45) Date of Patent: Sep. 9, 2003

(54) PROCESS FOR GENERATING A COMPUTER IMAGE OF A THREE-DIMENSIONAL OBJECT PROVIDED WITH A SPECIAL-EFFECT COATING

(75) Inventors: Paul Rupieper, Wuppertal (DE); Christian Voye, Gevelsberg (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/722,757

(22) Filed: Nov. 27, 2000

(51) Int. Cl.$^7$ .............................................. G06T 15/60
(52) U.S. Cl. ...................... 345/426; 356/445; 356/446; 118/712
(58) Field of Search ................................ 356/402, 446, 356/445; 345/604, 426, 581, 589; 118/712

(56) References Cited

U.S. PATENT DOCUMENTS

| | | | | |
|---|---|---|---|---|
| 5,559,604 A | * | 9/1996 | Arai | 356/402 |
| 5,867,169 A | * | 2/1999 | Prater | 345/604 |
| 5,963,334 A | * | 10/1999 | Yamaguchi et al. | 356/402 |
| 5,991,042 A | * | 11/1999 | Rupieper et al. | 356/446 |
| 6,249,751 B1 | * | 6/2001 | Asaba et al. | 356/402 |

OTHER PUBLICATIONS

Newell et al ("The Progression of Realism in Computer Generated Images": ACM: 1977).*

Opticore Total Design Solutions.

Opticore Opus Realizer.

Opticore Opus Studio.

* cited by examiner

*Primary Examiner*—Mano Padmanabhan
(74) *Attorney, Agent, or Firm*—Hilmar L. Fricke

(57) ABSTRACT

A process for generating a computer image of a three-dimensional object provided with a special-effect coating, involves coating a test panel with the coating, taking a plurality of angle-dependent colorimetric measurements of the coating; storing the calorimetric data in a datafile with assignment of the corresponding angles; facetting the visible surfaces of a three-dimensional object by computer into a sufficient number of flat polygonal areas each being sufficiently small for the sufficiently accurate description of the surface topography; assigning the colorimetric data to each individual polygonal area by computer as a function of the position of an observer and at least one illumination source; and assembling the polygonal areas into a computer image of a three-dimensional object with a visually perceptible special-effect coating thereon.

22 Claims, No Drawings

PROCESS FOR GENERATING A COMPUTER IMAGE OF A THREE-DIMENSIONAL OBJECT PROVIDED WITH A SPECIAL-EFFECT COATING

FIELD OF THE INVENTION

The present invention relates to a process for the generation of a computer image of a three-dimensional object, particularly those objects that have a special-effect coating applied thereto.

BACKGROUND OF THE INVENTION

The computer-aided, three-dimensional image of an actually existing or virtual three-dimensional object belongs to the prior art. The observer be given an impression of the optical effect of a simple (e.g., single-color) version of the three-dimensional object (cf. brochure on OPUS software version 3.2 from Opticore). However, a realistic computer image of a three-dimensional object in which the intended effects of a special-effect coating (e.g., coatings that change color or hue depending on the viewing angle and/or illumination angle) can be observed is not known in the prior art. Rather, it was necessary to apply the special-effect coating concerned to an actual prototype of the object, or the object itself in order to be able to experience the full optical effect of the coating. This manufacture of prototypes, for example, in the motor vehicle sector, is not economically viable.

There is a need to provide a process which permits the realistic representation on computer of three-dimensional objects provided with special-effect coatings. More particularly, it should be possible to apply the process to the generation of a computer image of motor vehicle bodies and motor vehicle body parts provided with special-effect coatings.

SUMMARY OF THE INVENTION

The invention comprises a process for the generation of a computer image of a three-dimensional object having a special-effect coating thereon, comprising the steps of, in appropriate order:

a) coating a test panel with a special-effect coating;

b) taking a plurality of angle-dependent calorimetric measurements of the coating;

c) storing the colorimetric data in a datafile with assignment of the corresponding angles;

d) facetting the visible surface(s) of a three-dimensional object by computer into a sufficient number of flat polygonal areas each being sufficiently small for the sufficiently accurate description of the surface topography;

e) assigning the calorimetric data to each individual polygonal area by computer as a function of the position of an observer and at least one illumination source; and f) assembling the polygonal areas into a computer image of the three-dimensional object with a visually perceptible special-effect coating thereon.

DETAILED DESCRIPTION OF THE EMBODIMENTS

The process of the present invention enables the visual observation of a special-effect coating on a three dimensional object in a "virtual" mode. By the term "virtual" we mean that the image or representation of the object exists in a digital or electronic format in a computer. In one embodiment, the object itself may exist only in the computer in digital/electronic form. In another embodiment, the object may be an actual existing object.

Essentially, the process comprises a series of steps in three major groupings: (1) determining the data from the special-effect coating (based on viewing angle, illumination, or other relevant criteria); (2) defining the surface topography data of the three-dimensional object; and (3) merging the two datasets to form a computer image of the three-dimensional object. It will be readily apparent that it does not matter if one determines the coating values first or determines the object topography first in the process. However, it is clear that both must be finished before the respective datasets can be merged. Thus, there is flexibility in the order of performing the steps in the process.

In determining the data from the special-effects coating, the coating is applied to a test panel and an angle-dependent colorimetric measurement is carried out. Angle dependence in this case means dependence on the illumination angle and/or observation angle. In a first embodiment, the colorimetric measurement is carried out at a constant illumination angle but a varied observation angle. In a second embodiment, the observation angle remains constant during the colorimetric measurement step, but the illumination angle changes. In a third and preferred embodiment, both the observation angle and the illumination angle change during the measurement step. In each embodiment, the data from the measurement are stored in a datafile with assignment of the corresponding illumination and/or observation angles.

The test panel can, of course, be any panel suitable for the desired special-effect coating. It is often advantageous for the panel to be of the same material as the end-use application. For automotive applications of the special-effect coating, a metal test panel, for example, body steel or aluminum, or of plastic, for example, 10 cm times 15 cm to 30 cm times 60 cm in size conventionally used for test coatings. The test panel may be uncoated or provided with a single-layer or multi-layer precoating. Metal test sheets may be provided with, for example, an electrodeposition coating layer conventionally used in motor vehicle coating, or with an electrodeposition coating layer and a primer surfacer layer. Plastics panels may be provided with a plastics primer. It is preferred if the test panels used in the process according to the invention are provided with a precoating with which the three-dimensional object is to be provided in actual use.

The test panel can be coated with the special-effect coating by any conventional means. Preferably the panel is coated by spraying, preferably by means of a conventional coating robot, with a special-effect coating.

Special-effect coatings are coatings containing special-effect agents, coating layers of which may be applied which lead to different impressions of lightness (light/dark flop) and/or different impressions of color (color flop) on the part of the observer, depending on the viewing angle and/or illumination angle. Examples of special-effect agents that bring about a light/dark flop include conventional metallic flake pigments of aluminum, copper or other metals used, for example, in metallic base coats for automobiles. Examples of special-effect agents that bring about a more or less pronounced color flop include conventional special-effect pigments used in special-effect base coats, particularly interference pigments in flake form, such as, for example, metal oxide-coated metallic pigments, e.g., titanium dioxide- or iron oxide-coated aluminum; pearlescent pigments such as coated mica, e.g., titanium dioxide-coated mica; metal oxide or non metal oxide pigments in flake form, e.g., iron oxide in flake form or silica in flake form, metal oxide-coated silica or aluminum oxide in flake form, optically-variable pigments, and liquid crystal pigments.

The special-effect coatings may be waterborne, solvent-based or powder coatings. It is advantageous that the special-effect coating used to coat the test panel does not have to be ready developed in terms of technological properties such as, for example, adhesion, resistance to chipping, recoatability, resistance to weathering, i.e. its composition need by no means correspond to a special-effect coating to be used in reality. It must merely be formulated to provide the desired special-effect properties, particularly the desired special-effect color shade.

The special-effect coating may be overcoated with other layers, as is appropriate given the intended use of the special-effect coating. For automotive applications, the special-effect coating will usually be the base coat and will be overcoated with one or more clear coat layers. The layer thickness of the special-effect coating should approximate the intended real use applications. For automotive applications, the special-effect coating layer is, for example, from 8 to 40 µm thick it may be opaque or non-opaque according to the layer thickness desired in reality. If it is applied as a base-coat layer, a clear coat layer, for example, 25 to 80 µm thick, comprising one or more clear coat layers is then applied, also by spraying, preferably in the well known wet-in-wet process (two coat-one bake base coat/clear coat-process). The special-effect coating layer as well as the optionally applied clear coat layer is dried or cured, for example, stoved.

During the preparation of the test panel coated with the special-effect coating, for example, during application and drying or curing of the special-effect coating and optionally of the clear coat, the test panel may assume a horizontal or preferably vertical position. It is particularly preferable to provide one test panel in a horizontal position and a further test panel in a vertical position and optionally one or more further test panels in (various) positions arranged between the horizontal and vertical position with the special-effect coating.

The procedure used to take the calorimetric measurements of the coated test panel is known to those skilled in the art. The colorimetric measurement may be an angle-dependent direct determination of RGB values (red-green-blue values) with a color camera for example serving as the measuring instrument. The measurements are carried out preferably, however, as gonio-spectrophotometric measurements, wherein RGB values may be obtained indirectly.

In gonio-spectrophotometric colorimetry, the reflectance curves of the visible light in the range from, for example, 380 to 800 nm are determined at various observation angles. The determination of the reflectance curves may be carried out for any number of different observation angles. In the present invention, a determination at, for example, 5 observation angles of for example 15, 25, 45, 75 and 110° to the specular reflection is generally sufficient. From these points, the reflectance curves for other observation angles can be determined by extrapolation with good accuracy.

In embodiments of the invention having a fixed illumination angle, the illumination angle is preferably 45° to the perpendicular. In embodiments where the illumination angle varies, there may be used any number of different illumination angles. In the present invention, measurements at, for example, 4 illumination angles of for example 15, 25, 45 and 75° to the perpendicular are generally sufficient because, from these points, the reflectance curves for other illumination angles can be determined by extrapolation with good accuracy.

It is to be mentioned here that the term "accuracy of the image" as used in describing the process of this invention means the quality of impression of the image in matching the impression of the real object. The closer the image to the real object, the better the quality or accuracy of the image.

In colorimetry, light with a known spectral intensity distribution, preferably polychromatic light, is used for illumination. Examples of polychromatic light include, white light, diffuse daylight (standard illuminant D65), neon light (F illuminants) or incandescent lamp light (standard illuminant A). See, e.g., *International Commission on Illumination*, Publication CIE No 15.2, 1986, Central Bureau of the CIE, A-1033 Vienna, P.O.Box 169, Austria or G.Wyszecki, W. S. Stiles, *Color Science*, Wiley, N.Y., 1982, the disclosures of which are incorporated herein by reference. From the reflectance curves obtained by using a given illumination source, it is possible to calculate the color locations resulting for other desired illuminants, for example, the customary calorimetric parameters in the CIELab system L* (lightness), a* (red-green value), b* (yellow-blue value) and hence also C* (chroma) and h*(hue). See DIN 6174. From the reflectance curves (or the colorimetric parameters L*, a*, b*, C* and h*) it is possible to calculate RGB values by transformation, for example, using suitable mathematical algorithms. See Yevgeny Vishnevsky, *Introduction to Color (Java)*. 1997 Master's Project, www.cs.rit.edu/~ncs/color; Wyszecki, et al. *Color Science*, Wiley, N.Y., 1982; and M. D. Fairchild, *Color Appearance Models*, Addison-Wesley, Reading, 1998, the disclosures of which are incorporated herein by reference. Conventional colorimetry instruments known to the skilled person, for example, the X-Rite MA 68 sold by X-Rite Company can be used to determine the reflectance curves.

In addition to the angle-dependent colorimetric measurement of the special-effect coatings, a gloss measurement may be carried out. Conventional goniophotometric methods based on the principle of light reflection known to the skilled person can be used to measure gloss. The gloss measurement may take place at one or more different angles, preferably 20° to the perpendicular. All the conventional gloss meters known to the skilled person may be used, for example, the Microgloss® and Micro-Tri-Gloss® sold by BYK-Gardner.

The colorimetric data, i.e., reflectance curves, or L*, a*, b*, C*, h* values, or RGB values, and optionally gloss values are stored in form of a datafile with assignment of the corresponding observation and illumination angles, and optionally also of the position of the test panels obtaining during the preparation of the special-effect coating. The type of test panels concerned (type of material and optionally type of precoating before application of the special-effect coating layer) and the illuminant used during colorimetry may also be assigned and stored, if desired. The data may be entered manually or entered directly from the relevant measuring device into the datafile.

In the process according to the invention, three-dimensional objects, particularly motor vehicle bodies or motor vehicle body parts, provided with a special-effect coating are represented. The three-dimensional objects may be actually existing objects or, in particular, objects which exist only as a computer-generated object. The three-dimensional objects exist as three-dimensional objects defined by their computer aided design ("CAD") data. CAD data records of three-dimensional objects may be created with conventional, commercially available software, such as CATIA from Dassault, Pro/Engineer from ICEM/Surf or Alias Wavefront from Silicon Graphics. For the purposes of the process according to the invention, a CAD data record which is suitable for describing the topography (i.e., form design) of the visible surfaces of the three-dimensional object concerned is sufficient. The CAD data record may be newly created accordingly, or generated from a complete CAD data record of the three-dimensional object by reduction. The reduction may be carried out with the same software as that used to create the CAD data records.

The visible surfaces of the three-dimensional object are surfaces visible to the observer, particularly directly visible surfaces. By way of example, in the context of an automobile body, such visible surfaces include the exterior surfaces of the automobile body and surfaces such as door sills. Internal surfaces of the vehicle, such as, for example, the motor space, the passenger space or the trunk are preferably not taken into account, nor are the internal surfaces of hollow spaces.

The visible surfaces defined by the CAD data of the three-dimensional object may be facetted by computer using commercially available virtual-reality software suitable for the realistic representation of surface topographies into a sufficient minimum number of flat polygonal areas (polygons) each being sufficiently small for the sufficiently accurate description of the relevant surface topography. Examples of suitable virtual-reality software include OPUS software from Opticore or AMIRA software from Indeed Visual Concepts.

The polygons are joined together by common edges. The type of polygons is, in principle, arbitrary. Various types of polygons may be combined for the realistic representation of the surface topography; the polygons are preferably exclusively triangular areas joined together by common edges.

The minimum number and the respective areas of the polygons depend on the degree of complexity of the surface topography of the visible surfaces of the three-dimensional object and the desired accuracy of the computer image in the process according to the invention. The sum of all the polygonal areas corresponds, in a close approximation, for example, with a deviation in the region of not more than ±2%, to the surface area of the visible surface(s) of the three-dimensional object. For example, 30,000 to 300,000 polygons are generally sufficient as the minimum number for the accurate description of the surface topography of a motor vehicle body. Of course, the number of polygons selected may be above the minimum number, for example, 50,000 to 3,000,000 polygons in the case of a motor vehicle body. In principle, the number of polygons selected may be any number above the minimum number, the accuracy of the computer image increasing with increasing number, albeit tending to a limiting value. A further increase in the number of polygons does not, in practice, lead to a further increase in accuracy discernible by the observer. It is expedient, therefore, to select a number of polygons above the minimum number which is in reasonable proportion to the computer capacity available.

The polygons have sufficiently small areas. All the areas may be the same size or different. The individual areas lie in a range of values from, for example, 1 square millimeter to 1 square meter. The more complex the surface topography, the smaller should be the area of the polygons selected. In the case of three-dimensional objects with regions of simple (no curvatures or only slight curvatures with up to infinite radius of curvatures per unit of area) and complex surface topography (many curvatures and/or pronounced curvatures per unit of area with a small radius of curvature, corners, beads, edges), it is expedient to facet these into polygons of different areas, i.e. regions of simple surface topography are facetted into polygons with areas within the upper range of values, areas of complex surface topography into polygons with areas within the lower range of values. For example, regions of simple and complex surface topography may be present on the visible surface of a three-dimensional object or on the visible surface of one or more components joined together to form a three-dimensional object, or the three-dimensional object is joined together from components with a simple surface topography and components with a complex surface topography.

Each polygon has a position in space. This position may be defined by means of the area center of gravity of the polygon concerned and its normal in space. Each of these area centers of gravity may be defined clearly, for example, by X,Y,Z coordinates in a Cartesian coordinate system and the position of each of these normals in space by means of their three angles, based on the Cartesian coordinate system. The position of an observer may be defined by $X',Y',Z'$ coordinates or by $X'_{left}, Y'_{left}, Z'_{left}$ and $X'_{right}, Y'_{right}$ and $Z'_{right}$ coordinates for the left and the right eye of an observer, and the position of one or more (n) illumination sources by $X''_1,Y''_1,Z''_1$, to $X''_n,Y''_n,Z''_n$ coordinates in the same Cartesian coordinate system.

By virtue of knowing the position of each individual polygon in space, the computer is able to assign to each individual polygon a viewing angle dependent on the position of the observer which corresponds to an observation angle from the colorimetric measurement, and illumination angle(s) dependent on the position of one or more illumination sources which correspond to the illuminations angles from the calorimetric measurement. The colorimetric data associated with those viewing angles and/or illumination angles (and optionally a correlating gloss value) can thus be correlated to the individual polygon. In order to increase the accuracy of the computer image in the process according to the invention, it may be expedient if the computer, when making this assignment, also takes into account the nature of each polygon (type of material, for example, in the case of three-dimensional objects composed of different materials; type of any precoating before application of the special-effect coating layer) and selects accordingly from the stored colorimetric data differentiated according to type of test panel.

In order to increase the accuracy of the computer image in the process according to the invention, it may also be expedient if the computer, when assigning the calorimetric data, takes account of the position of each individual polygon (when positioning the three-dimensional object, according to the position obtaining during the preparation of the special-effect coating on the three-dimensional object in reality) and selects accordingly from the stored calorimetric data differentiated according to the position of the test panels obtaining during the preparation of the special-effect coating. When the position of each polygon is taken into account, this is carried out advantageously in such a way that the calorimetric data available for a test panel coated in a horizontal position are assigned to polygons with a more horizontal position, whereas the colorimetric data available for a test panel coated in a vertical position are assigned to polygons with a more vertical position. If colorimetric data are available for test panels coated in a position between the horizontal and vertical, the same applies.

A fundamental color defined by RGB values may thus be assigned to each polygon, each polygon being represented by pixels in each case composed of a red-green-blue triple. Gloss reflections may be reproduced by varying the lightness or contrast of the pixels of the polygons concerned. By assembling the polygons, the object may be represented three-dimensionally in the corresponding visually perceptible impression of color. The object as a whole or a section of the object may be represented, for example, by means of a conventional zoom function. For the purposes of the process according to the invention, the use of a conventional personal computer (for example, Pentium III, 600 MHz with 3D graphics card) is sufficient in practice. Of course, computers with a higher computing capacity may be used to advantage.

The computer image may be carried out according to the visual impression produced in diffuse or directed illumination with one or more, preferably only one, illumination source.

The generation of the computer image is not confined to the reproduction with an illumination with the illuminant used during colorimetry. As explained above in connection with colorimetry, the colorimetric data are available independently of the illuminant used during colorimetry, or may be calculated if the illuminant used for illumination during colorimetry is known. The generation of the computer image may be carried out with simulated illumination with one illumination source or with several illumination sources of any spectral intensity distribution in the range of visible light by calculating the RGB values from the reflectance curve determined and stored during colorimetry with illumination with a known illuminant. In the event of several illumination sources, these preferably have an identical spectral intensity distribution in each case.

Optical effects such as mirror images, for example, of surrounding objects and/or shadows and/or the structure of the top coat layer and/or gloss reflections—if the representation of the gloss reflections is not to be carried out as explained above on the basis of measured gloss data—may be projected by computer onto the three-dimensionally represented object in that the RGB values are adjusted by the computer in terms of fundamental color, lightness, contrast. The simulation of such optical effects belongs to the prior art and may be executed, for example, with OPUS software from Opticore or AMIRA software from Silicon Graphics. Data for the structure of the top coat layer may be accepted from empirical values or may have been measured on the test panel, for example, with the Wave-scan® measuring instrument known to the skilled person and sold by BYK-Gardner.

The generation of the computer image may be carried out with all the conventional virtual-reality techniques. While it is preferred to use the process to generate three-dimensional computer images, it is also possible to generate two-dimensional perspective computer images.

The two-dimensional perspective image may be carried out in a conventional manner, for example, on a color monitor or by means of a projector onto a screen. The true three-dimensional image may be carried out with the conventional methods for producing colored stereo images. The offset images required for this, due to the distance between the eyes of an observer, may be calculated by the software by simulation or taking account of positions defined for the left and right eye. The observer may wear, for example, special spectacles as an aid, and observe the three-dimensional computer image on a color monitor, on a projection or back-projection screen whereby, depending on the physical principle used, two separate colored images which together make up a spatial image are shown either simultaneously (observation with pole filter spectacles) or with a high image changing frequency (observation with shutter spectacles). Another alternative is the corresponding image for the observer by way of a head-mounted display (helmet or spectacles) with two separate color displays for the left and right eye, or the complete three-dimensional computer image in a virtual-reality cave.

Irrespective of the medium chosen for the three-dimensional computer image, the computer image may be carried out as a static image, film, or as an interactive real-time computer image. In the computer image as a film and particularly in the real-time computer image, it is possible to alter the position of the object to be viewed and/or the position of the observer. Depending on the change in position, the computer carries out a constant reassignment of the RGB values to each pixel of each polygon. In the real-time computer image in particular, the computer learns the respective relative positions of object and observer and optionally illumination source(s) with the conventional means for the virtual-reality technique used in each case. For example, the observer may simulate a change in relative position by means of a computer mouse, a joystick or a data glove and thus control the computer. The observer may also actually move, however, and inform the computer of the change in relative position by means of a device connected to the observer, for example, by means of a transmitter or a camera which tracks a marking fixed to the observer.

The process according to the invention permits the generation of realistic computer images of three-dimensional objects provided with a special-effect coating, particularly motor vehicles. The computer image produces, for the observer, a realistic visual impression of a three-dimensional object coated with a special-effect coating. The impression of special effect and color and optionally gloss may be represented on the basis of measurement data determined on a test panel coated with special-effect coating. The computer image corresponds to the quality of a photo-realistic image and does not look artificial or lifeless like conventional computer images.

The process according to the invention can be carried out by one party or in cooperation between more parties. For example, the process steps a) to c) can be effected by one cooperation party, for example a paint manufacturer, while step d) is done by a second cooperation party, for example a car manufacturer. As to the steps e) and f), these can be carried out by any cooperation party. In case the process according to the invention is effected by several parties in cooperation, it can be expedient to use the possibilities offered by the modem information technologies. For example, one cooperation partner, for example a car manufacturer, who is in possession of the CAD data of the respective three-dimensional object can obtain online, for example via internet, the suitable colorimetric data which the other cooperation partner, for example a paint manufacturer, has got available and on this basis realize the process according to the invention.

The process according to the invention can also be used by a third party. This third party, for example a body paint shop, receives the necessary data online or offline from that or those business partner(s) who possess the necessary data. On that basis the third party can make use of the process according to the invention. For example a body paint shop is thus able to give a customer a realistic impression of his car to be painted completely or partly in one or several effect color shades (such as a decoration or inscription) and support the customer when choosing the effect color(s). In the same way a buyer for a new car can be supported when choosing an effect color for his new car to be ordered.

The process according to the invention may be used for presentation purposes. More particularly, however, it makes it possible for the form designer and designer of special-effect color shades to view a realistic computer image of the three-dimensional objects coated with special-effect coating and to use it for decision-making in matters of object and/or special-effect color shade design. Examples of such decision-making include:

1. Decision making, which surface topography (form design) leads to which visual overall and/or detailed impression of a three-dimensinal object if this is provided with a special-effect coating and what constructional details or what form design should be used or avoided in this connection. These decisions have become particularly important in the automotive sector, particularly in recent times since the trend in automobile construction is towards a mode of design without, or with the narrowest possible, joints between the individual components.
2. Decision making, in which lightness and/or color flop range special-effect color shades should be selected for a three-dimensional object with a given surface topography if troublesome visual impressions are to be avoided or if desired visual impressions are to be created.
3. Decision making, what is the effect of a three-dimensional object with a given surface topography in different given special-effect color shades and which special-effect color shades suit a certain object in a tasteful manner and can emphasize the character thereof.

These decisions may relate to a virtual object with a given surface topography or to an object which actually exists but has not yet been coated in reality in the special-effect color shade concerned and in that respect is a virtual object.

The process according to the invention may help in decision making without the need to build the objects in reality and coat them in the special-effect color shades concerned. This means an enormous saving in terms of costs, time and labor in the design of new forms and special-effect color shades of three-dimensinal objects. Expensive development errors may be avoided.

The process according to the invention may be used, for example, by automobile and/or automotive coatings producers. It offers a valuable aid to decision-making, for example, if used during an early styling phase.

The process according to the invention may also, of course, be used in a very similar way for the generation of a computer image of single-color coated three-dimensional objects by using single-color coatings instead of special-effect coatings when coating the test panel(s).

Finally, it should be apparent to the skilled artisan that the process of the invention may also be used to make actual, tangible objects from the computer image. Such objects can include two-dimensional images printed on paper or other substrates or three-dimensional objects.

What is claimed is:

1. A process for the generation of a computer image of a three-dimensional object having a special-effect coating thereon, comprising the steps of, in appropriate order:
    a) coating a test panel with a uniformly thick special-effect coating;
    b) taking calorimetric measurements of the coating at more than one angle;
    c) storing the colorimetric data in a data-file with assignment of the corresponding angles;
    d) faceting the visible surfaces of a three-dimensional object by computer into a sufficient number of flat polygonal areas each being sufficiently small for the sufficient accurate description of the surface topography;
    e) assigning the calorimetric data to each individual polygonal area by computer as a function of the position of an observer and at least on illumination source; and
    f) assembling the polygonal areas into a computer image of the three-dimensional object with a visually perceptible special effect coating thereon.

2. The process of claim 1, wherein step b) comprises measuring the coating at a constant illumination angle and multiple observation angles, and wherein step c) comprises storing the calorimetric data in form of a datafile with assignment of the respective illumination angle and of the corresponding observation angles.

3. The process of claim 1, wherein step b) comprises measuring the coating at a constant observation angle and multiple illumination angles, and wherein step c) comprises storing the colorimetric data in form of a datafile with assignment of the respective observation angle and of the corresponding illumination angles.

4. The process of claim 1, wherein step b) comprises measuring the coating at multiple illumination angles and multiple observation angles and wherein step c) comprises storing the colorimetric data in form of a datafile with assignment of the corresponding observation angles and illumination angles.

5. The process of claim 1, wherein the special-effect coating is a special-effect base coat/clear coat two-coat coating.

6. The process of claim 1, wherein the test panel in step a) is in an orientation selected from the group consisting of a horizontal orientation and a vertical orientation.

7. The process of claim 1, wherein a first test panel is coated and measured in a horizontal orientation and a second test panel is coated and measured in a vertical orientation, and wherein the respective calorimetric data are stored with assignment of the relevant orientation of the test panel and selected accordingly when assigned to each individual polygonal area.

8. The process according to claim 7, wherein at least one additional test panel is coated and measured at an orientation between the horizontal and the vertical and wherein the respective calorimetric data for such at least one additional test panel are stored with assignment of the relevant orientation of the test panel and selected accordingly when assigned to each individual polygonal area.

9. The process of claim 1, wherein step b) comprises angle-dependent direct determinations of RGB values with a color camera as measuring instrument.

10. The process of claim 1, wherein step b) comprises gonio-spectrophotometric measurements.

11. The process of claim 1, wherein step a) comprises coating at least two test panels made of different materials and wherein the respective colorimetric data for each test panel are stored with assignment of the type of materials of such test panels and, when assigned to each individual polygonal area, are selected according to the type of each individual polygonal area.

12. The process of claim 1, wherein the respective calorimetric data are stored with assignment of the illuminant used for illumination during step b) and, when assigned to each individual polygonal area, are selected according to the illuminant of the illumination chosen during the generation of the computer image.

13. The process of claim 1, wherein the computer image simulates the effects of a single illumination source on the three-dimensional object with the special-effects coating.

14. The process of claim 1, wherein the computer image simulates the effects of at least two illumination sources on the three-dimensional object having the special-effects coating.

15. The process of claim 1, wherein the calorimetric data are assigned to each individual polygon in the form of RGB data.

16. The process of claim 1, wherein the computer image of the three-dimensional object includes optical effects selected from the group consisting of mirror images, shadows, structure of the top coat layer, gloss reflections and combinations thereof.

17. The process of claim 1, wherein the computer image is selected from the group consisting of a two-dimensional perspective computer image and a three-dimensional computer image.

18. The process of claim 1, wherein the computer image is selected from the group consisting of static image, film and interactive real-time computer image.

19. The process of claim 1, wherein the three-dimensional objects are selected from the group comprising motor vehicle bodies and motor vehicle body parts.

20. The process of claim 1, wherein the three-dimensional object in step d) is selected from the group consisting of virtual objects and actual objects.

21. The process of claim 1, further comprising the step of:
  g) generating an actual object from the computer image.

22. The process of claim 21, wherein the actual object is selected from the group consisting of two-dimensional images and three-dimensional objects.

* * * * *

UNITED STATES PATENT AND TRADEMARK OFFICE
CERTIFICATE OF CORRECTION

PATENT NO. : 6,618,050 B1
DATED : September 9, 2003
INVENTOR(S) : Paul Rupieper and Christian Voye It is certified that error appears in the above-identified patent and that said Letters Patent is hereby corrected as shown below:

Title page,
Item [57], ABSTRACT,
Line 5, the word "calorimetric" should read -- colorimetric --

Column 1,
Lines 45 and 54, the word "calorimetric" should read -- colorimetric --

Column 3,
Line 45, the word "calorimetric" should read -- colorimetric --

Column 4,
Line 24, the word "calorimetric" should read -- colorimetric --

Column 6,
Lines 38, 53, 58 and 63, the word "calorimetric" should read -- colorimetric --

Column 9,
Line 66, the word "calorimetric" should read -- colorimetric --

Column 10,
Lines 8, 18, 41, 48 and 64, the word "calorimetric" should read -- colorimetric --
Line 10, "least on" to be replaced by -- least one --

Column 11,
Line 11, the word "calorimetric" should read -- colorimetric --

Signed and Sealed this

Thirtieth Day of December, 2003

JAMES E. ROGAN
*Director of the United States Patent and Trademark Office*